(12) United States Patent
Martinez Torres et al.

(10) Patent No.: US 11,078,999 B2
(45) Date of Patent: Aug. 3, 2021

(54) TORQUE CONVERTER WITH WAVY CONNECTION BETWEEN DAMPER AND BYPASS CLUTCH

(71) Applicant: SCHAEFFLER TECHNOLOGIES AG & CO. KG, Herzogenaurach (DE)

(72) Inventors: Jorge Arturo Martinez Torres, Wooster, OH (US); Drew Hilty, Wooster, OH (US); Long Souers, North Canton, OH (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 0 days.

(21) Appl. No.: 16/578,469

(22) Filed: Sep. 23, 2019

(65) Prior Publication Data

US 2021/0088118 A1    Mar. 25, 2021

(51) Int. Cl.
*F16H 45/02* (2006.01)
*F16F 15/12* (2006.01)
*F16H 61/14* (2006.01)

(52) U.S. Cl.
CPC ............. *F16H 45/02* (2013.01); *F16F 15/12* (2013.01); *F16H 61/14* (2013.01); *F16H 2061/147* (2013.01)

(58) Field of Classification Search
CPC ............. F16H 45/02–2045/0294; F16F 15/12
See application file for complete search history.

(56) References Cited

U.S. PATENT DOCUMENTS

| 4,785,924 | A | * | 11/1988 | Jackel ................. F16F 15/129 |
|---|---|---|---|---|
| | | | | 192/214.1 |
| 6,193,037 | B1 | | 2/2001 | Middelmann et al. |
| 6,929,106 | B2 | | 8/2005 | Watanabe et al. |
| 9,841,064 | B2 | | 12/2017 | Smith et al. |
| 2001/0013454 | A1 | | 8/2001 | Yamamoto |
| 2002/0027053 | A1 | | 3/2002 | Back et al. |
| 2004/0007435 | A1 | | 1/2004 | Back et al. |
| 2006/0150686 | A1 | | 7/2006 | Lonati et al. |

(Continued)

FOREIGN PATENT DOCUMENTS

| EP | 1574749 A1 | 9/2005 |
|---|---|---|
| JP | 2017133651 A | 8/2017 |

OTHER PUBLICATIONS

Written Opinion and International Search Report for PCT/US2020/051951, dated Jan. 13, 2021, 11 pages.

*Primary Examiner* — Ernesto A Suarez
*Assistant Examiner* — Lillian T Nguyen
(74) *Attorney, Agent, or Firm* — Dickinson Wright PLLC

(57) ABSTRACT

A torque converter includes a case and a bypass clutch having a plate rotationally fixed to the case and a friction disk having a friction material configured to engage with the plate to rotationally couple the friction disk to the plate when the bypass clutch is engaged. The friction disk includes a first circumferential connection surface having a plurality of alternating convex and concave arcuate segments. A drive plate includes a second circumferential connection surface having a plurality of alternating convex and concave arcuate segments. The first and second connection surfaces are in meshing engagement with the convex segments of the friction disk meshing with the concave segments of the drive plate and with the concave segments of the friction disk meshing with the convex segments of the drive plate.

20 Claims, 6 Drawing Sheets

(56) References Cited

U.S. PATENT DOCUMENTS

| | | | |
|---|---|---|---|
| 2007/0246317 A1* | 10/2007 | Tomiyama | F16H 45/02 192/3.29 |
| 2012/0152681 A1* | 6/2012 | Avins | F16H 45/02 192/3.29 |
| 2014/0291107 A1 | 10/2014 | Lister et al. | |
| 2015/0021137 A1* | 1/2015 | Lindemann | F16H 41/24 192/3.29 |
| 2015/0152951 A1 | 6/2015 | Rentfrow | |
| 2017/0328457 A1 | 11/2017 | Vanni et al. | |
| 2017/0343092 A1* | 11/2017 | Arhab | F16D 33/18 |
| 2018/0051754 A1 | 2/2018 | Lindemann et al. | |

\* cited by examiner

TORQUE CONVERTER WITH WAVY CONNECTION BETWEEN DAMPER AND BYPASS CLUTCH

TECHNICAL FIELD

The present disclosure relates to torque converters and more specifically to connecting a friction disk of a bypass clutch to a drive plate of a damper.

BACKGROUND

Many vehicles include a launch device between the engine and the transmission. A torque converter is a type of launch device commonly used in vehicles having an automatic transmission. A typical torque converter includes an impeller fixed to the crankshaft of the engine and a turbine fixed to a turbine shaft, which is the input to the transmission. To improve fuel economy, most torque converters include a bypass clutch that mechanically couples the turbine shaft to a case of the torque converter to bypass the fluid coupling.

SUMMARY

According to one embodiment, a torque converter includes a case defining a chamber, an impeller disposed in the chamber, and a turbine disposed in the chamber adjacent to the impeller and configured to create a fluid coupling with the impeller. A bypass clutch is disposed in the case and includes a plate fixed to the case and a friction disk having a friction material configured to engage with the plate to rotationally couple the friction disk to the plate when the bypass clutch is engaged. The friction disk has a first connection surface with a first undulated profile oriented in a radial direction of the torque converter. A damper is configured to transmit torque from the bypass clutch to a turbine shaft. The damper includes a drive plate circumscribed by the first connection surface. The drive plate has a second connection surface with a second undulated profile oriented in the radial direction. The first and second connection surfaces are in meshing engagement to couple the friction disk to the drive plate.

According to another embodiment, a torque converter includes a case and a bypass clutch having a plate rotationally fixed to the case and a friction disk having a friction material configured to engage with the plate to rotationally couple the friction disk to the plate when the bypass clutch is engaged. The friction disk includes a first circumferential connection surface having a plurality of alternating convex and concave arcuate segments. A drive plate includes a second circumferential connection surface having a plurality of alternating convex and concave arcuate segments. The first and second connection surfaces are in meshing engagement with the convex segments of the friction disk meshing with the concave segments of the drive plate and with the concave segments of the friction disk meshing with the convex segments of the drive plate.

According to yet another embodiment, a torque converter includes a case defining a chamber, an impeller disposed in the chamber, a turbine disposed in the chamber adjacent to the impeller and configured to create a fluid coupling with the impeller, and a bypass clutch having a plate fixed to the case and a friction disk having a friction material configured to engage with the plate to rotationally couple the friction disk to the plate when the bypass clutch is engaged. The friction disk includes a first circumferential connection surface having a plurality of alternating convex and concave arcuate segments. A damper of the torque converter includes a driven plate connectable to a turbine shaft, a drive plate rotationally fixed to the friction disk and the turbine, and a resilient member connecting the driven plate to the drive plate. The drive plate includes a second circumferential connection surface circumscribed by the first connection surface and having a plurality of alternating convex and concave arcuate segments meshing with the concave and convex segments of the friction disk to rotationally fix the drive plate to the friction disk.

DETAILED DESCRIPTION

Figure 1:
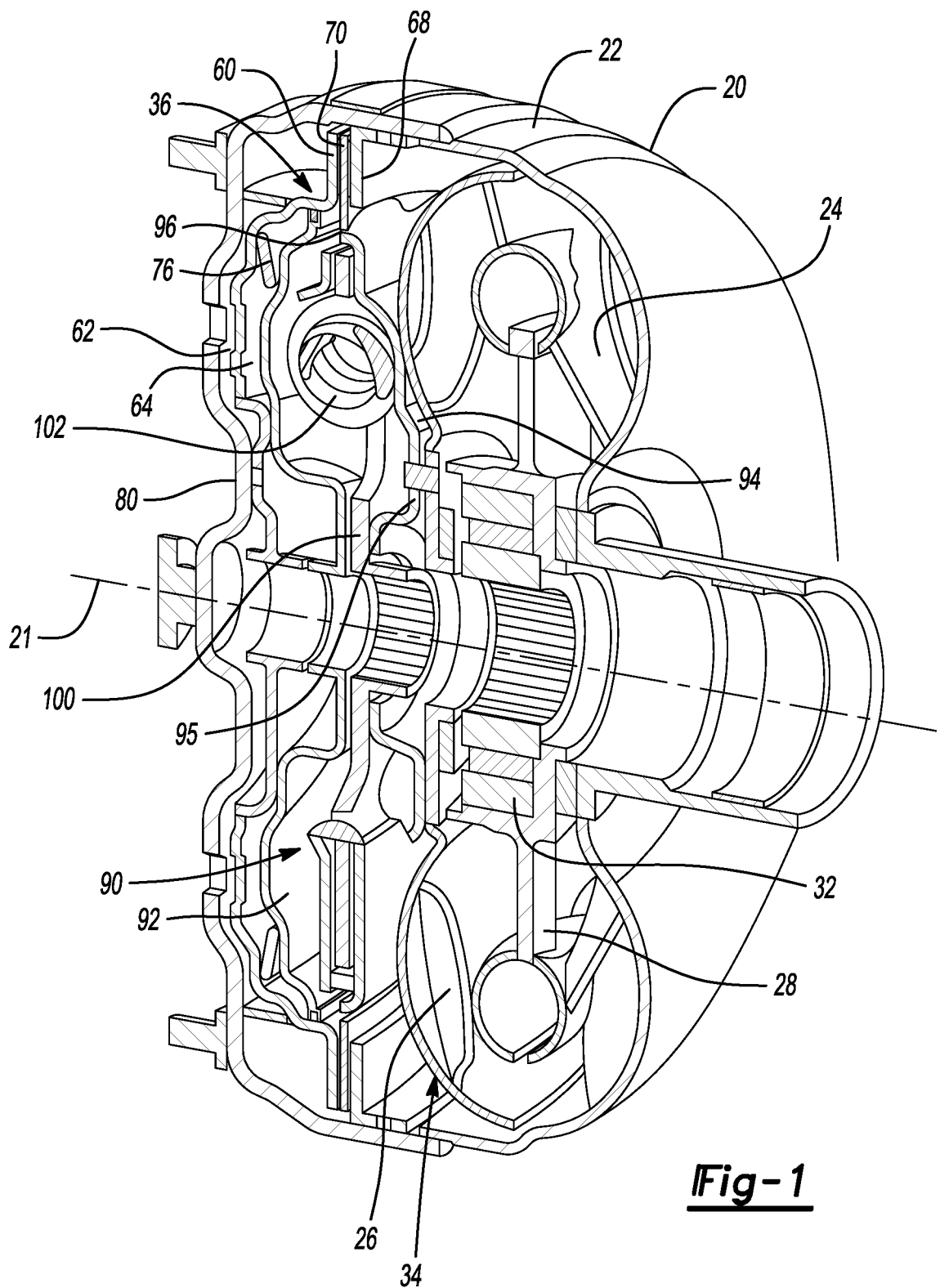
FIG. 1 is a perspective view, in cross section, of a torque converter.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Directional terms used herein are made with reference to the views and orientations shown in the exemplary figures. A central axis is shown in the figures and described below. Terms such as "outer" and "inner" are relative to the central axis. For example, an "outer" surface means that the surfaces that are radially outboard of another "inner" surface. Terms such as "radial," "diameter," "circumference," etc. also are relative to the central axis. The terms "front," "rear," "upper" and "lower" designate directions in the drawings to which reference is made.

Figure 2:
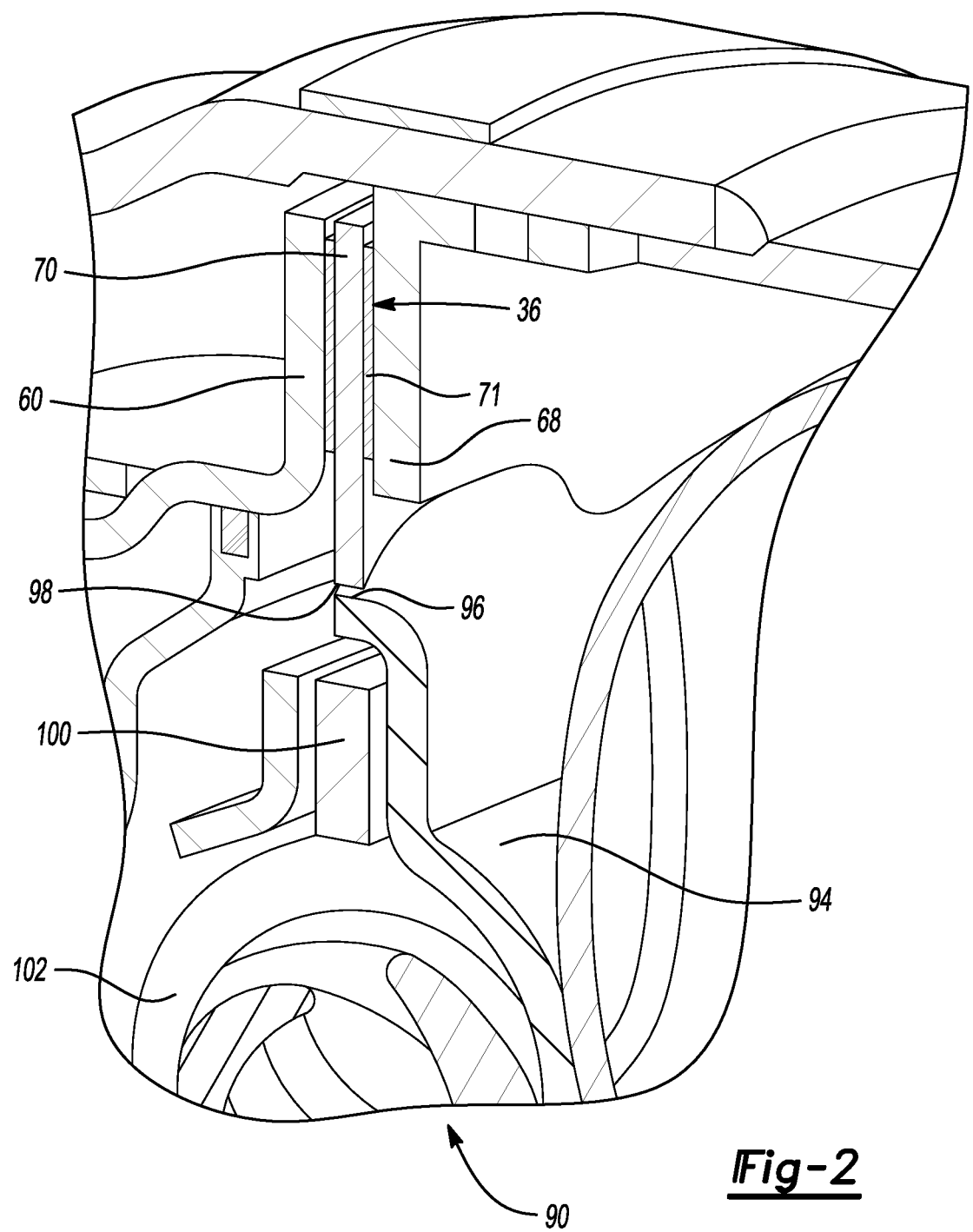
FIG. 2 is a magnified view of a bypass clutch and damper of the torque converter FIG. 1.

Referring to FIGS. 1 and 2, a vehicle may include an automatic transmission coupled to a powerplant, e.g., an engine, by a torque converter 20. The torque converter 20 includes a central axis 21. Many of the components of a torque converter are centered on the axis 21 and are circular and concentric with the central axis 21. The torque converter 20 includes a case 22 fixed to a crankshaft of the engine. An impeller 24 is fixed to the case 22 and rotates with the crankshaft. A turbine 26 is disposed adjacent to the impeller 24 within a hydrodynamic chamber 34 of the torque converter 20 and is connected, e.g., splined, to a turbine shaft (not shown) that supplies power to the transmission.

A stator 28 is coupled to a stator shaft (not shown) by a one-way clutch 32. The stator shaft is fixed to a front support of the transmission and is stationary relative to the torque converter 20. When the turbine shaft is stationary or rotating slowly compared to the crankshaft, the one-way clutch 32 holds the stator 28 stationary. Rotation of the impeller 24 forces fluid to move between the impeller 24, the turbine 26, and the stator 28. The fluid exerts a hydrodynamic torque on the turbine 26. The stator 28 provides a reaction force causing the torque on the turbine 26 to be greater than the torque on the impeller 24. When the speed of the turbine 26 approaches that of the impeller 24, fluid tends to flow around the centerline of the torque converter, causing the one-way clutch 32 to overrun.

The torque converter 20 includes a bypass clutch 36 that mechanically connects the turbine 26 to the case 22 to bypass the hydrodynamic power flow path of the torque converter 20. In the illustrated embodiment, the torque converter is a four-passageway torque converter (four pass) but may be a two pass or a three pass in other embodiments. The bypass clutch 36 is often engaged during cruise to improve fuel efficiency. The bypass clutch 36 may include at least one plate 68 fixed to the case 22 and at least one friction disk (clutch disk) 70 having a friction material 71 disposed thereon. The friction disk 70 is sandwiched between the clutch piston 60 and the plate 68. The clutch 36 is engaged by moving the clutch piston 60 towards the plate 68 to frictionally lock the plate 68 and the disk 70. The turbine 26 is fixed to the disk 70 by one or more intermediate components. Thus, the turbine 26 is fixed to the impeller 24, via the case 22, when the bypass clutch 36 is fully engaged. Other bypass clutch designs may be used in the torque converter 20.

The clutch piston 60 may be controlled by an apply chamber 62 and a compensation chamber 64. A resilient member 76 may be disposed in the compensation chamber 64 and biased to urge the clutch piston 60 towards the front wall 80 so that the clutch 36 is disengaged by default. The resilient member 76 may be a diaphragm spring, a wave spring, or the like.

The turbine 26 and the friction disk 70 are connected to the turbine shaft via a damper 90. The damper 90 includes a disk-shaped cover plate 92, a disk-shaped drive plate 94, a disk-shaped driven plate 100, and one or more resilient members 102. The resilient member 102 may be one or more arc springs. The drive plate 94 is fixed to the turbine 26 and the friction disk 70 so that the three rotate in unison. The drive plate 94 may include a radially oriented face 95 that is fastened to the turbine 26, such as by the illustrated rivets. The drive plate 94 may be connected to the friction disk 70 through an intermeshing connection. For example, an outer circumferential edge 96 of the drive plate 94 is attached to an inner circumferential edge 98 of the friction disk 70.

The driven plate 100 is connected to the drive plate 94 via the one or more resilient members 102. The driven plate 100 is configured to connect with the turbine shaft. For example, the driven plate 100 may include a hub having splines configured to engage with matching splines of the turbine shaft. During operation of the torque converter 20, the drive plate 94 receives power from either the turbine 26 or the case 22, and in turn drives the driven plate 100 to rotate the turbine shaft.

Figure 3:
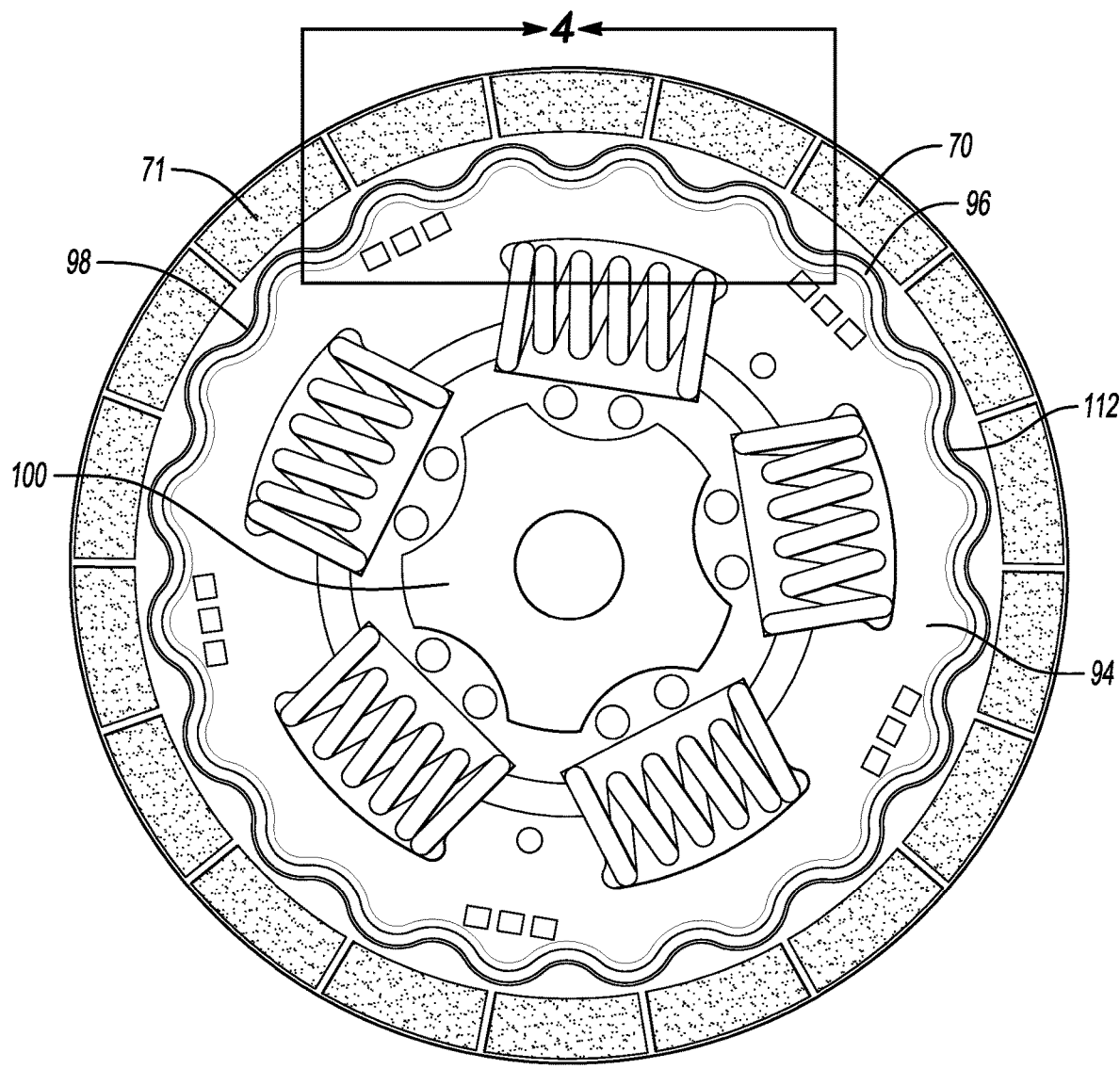
FIG. 3 is a front view of a friction disk and drive plate of the torque converter FIG. 1.
Figure 4:
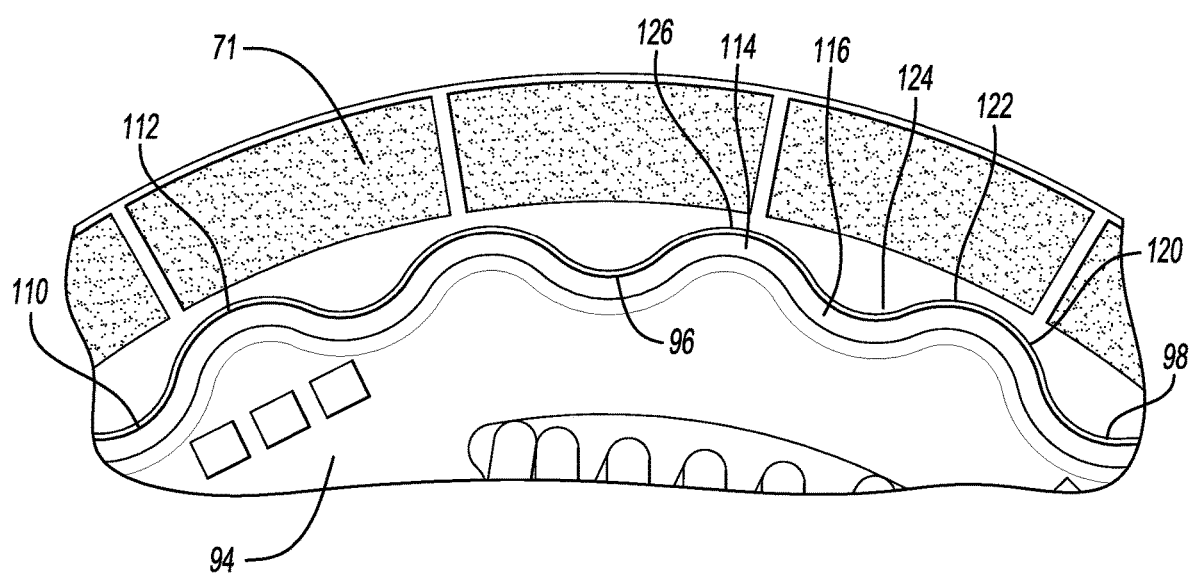
FIG. 4 is a magnified view of FIG. 3 at area 4-4.

Referring to FIGS. 3 and 4, in the illustrated embodiment, the outer circumferential edge 96 of the drive plate 94 is a connection surface 110 having an undulated (wavy) profile 112 oriented in a radial direction of the torque converter 20. The undulated profile 112 includes alternating convex 114 and concave 116 arcuate segments. Each of the arcuate segments 114, 116 may have a continuous radius. All of the convex segments 114 may have the same radius, and all of the concave arcuate segments 116 may have the same radius. Additionally, the radii of the convex segments 114 may be the same as the radii of the concave segments 116. In alternative embodiments, the radii of the convex segments 114 may not be the same as the radii of the concave segments 116. The arc length of the convex segments 114 may be longer than the arc length of the concave segments 116.

The inner circumferential edge 98 of the friction disk 70 is a connection surface 120 having an undulated profile 122 that matches the undulated profile 112. The undulated profile 122 also includes alternating convex 124 and concave 126 arcuate segments. Each of the arcuate segments 124, 126 may have a continuous radius. All of the convex segments 124 may have the same radius, and all of the concave arcuate segments 126 may have the same radius. Additionally, the radii of the convex segments 124 may be the same as the radii of the concave segments 126. In alternative embodiments, the radii of the convex segments 124 may not be the same as the radii of the concave segments 126. The arc length of the convex segments 124 may be shorter than the arc length of the concave segments 126.

The connection surfaces 110 and 120 are in meshing engagement to couple the friction disk 70 to the drive plate 94. The intermeshing undulated profiles 112, 122 may be stronger than toothed designs and less prone to breakage. The convex segments 114 are received in the concave segments 126, and the convex segments 124 are received in the concave segments 116. The radii of the convex segments 114 substantially match the radii of the convex segments 126 and the radii of the convex segments 124 substantially match the radii of the convex segments 116 so that the connection surfaces substantially match and mesh with each other. In this context, "substantially" refers to a manufacturing clearance provided between the friction disk 70 and the drive plate 94 to ease assembly.

Figure 5:
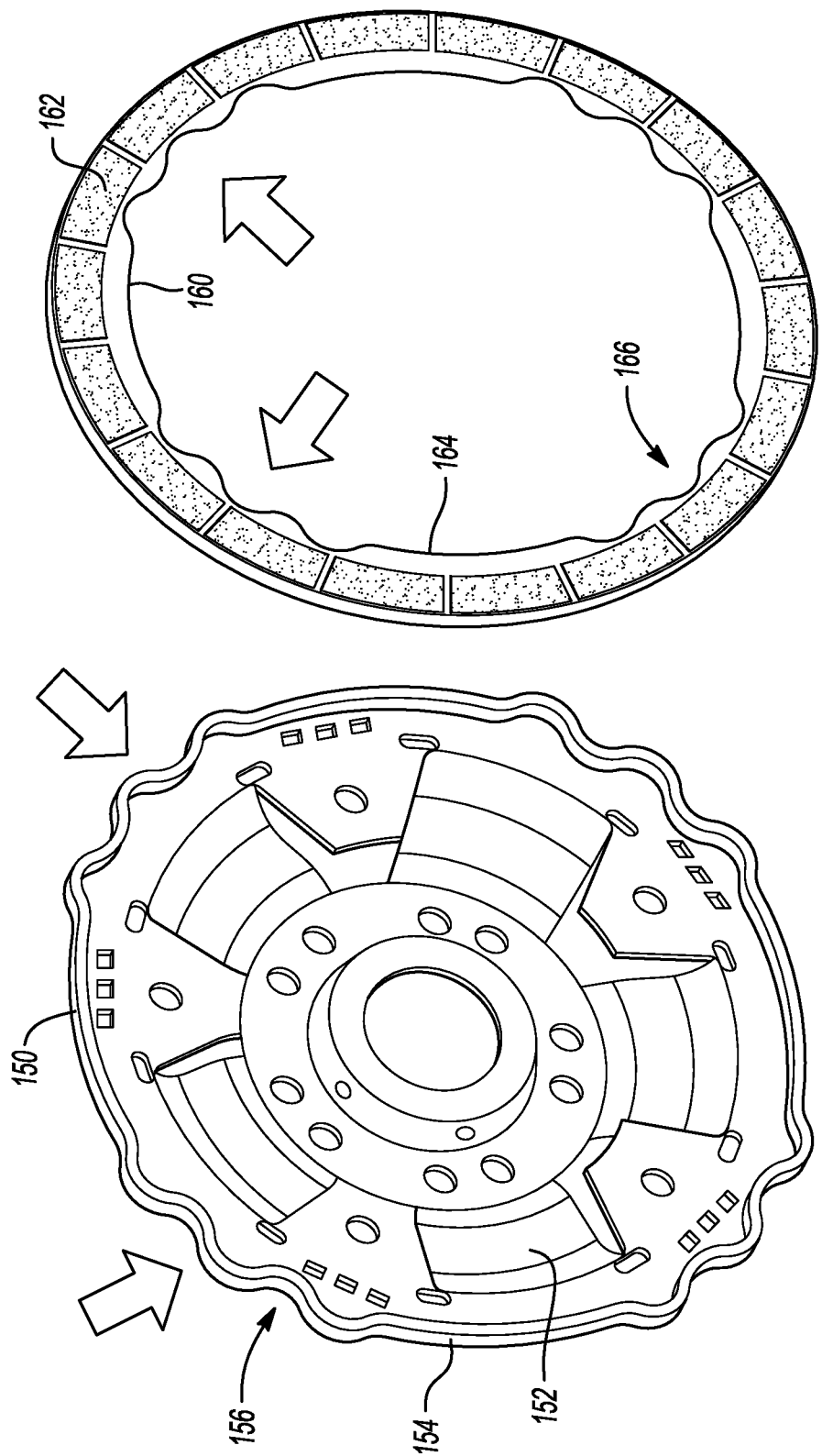
FIG. 5 is an exploded view of a friction disk and drive plate according to an alternative embodiment.

In the above example, the undulating profiles 112, 122 are continuous around the circumference of their respective connection surface, however, they do not have to be continuous. FIG. 5 illustrates an embodiment in which the undulating profiles are discontinuous. Here, the outer circumferential edge 150 of the drive disk 152 includes arcuate flat spots 154 that do not have undulations. The drive disk 152 includes sections of undulated profile 156 disposed between the flat spots 154. The undulated profile 156 may be the same or similar as the profile 112 described above albeit not continuous around the drive disk. The inner circumferential edge 160 of the friction disk 162 matches the outer circumferential edge 150 so that the drive disk 152 and the friction disk 162 can be connected via meshing engagement. The outer circumferential edge 150 includes arcuate flat spots 164 and sections of undulated profile 166 that substantially match with the drive disk 152. The embodiment of FIG. 5 can be used to create alignment features so that the drive disk 152 can only be connected to the friction disk 162 when in the correct rotational position relative to the friction disk 162.

Figure 6:
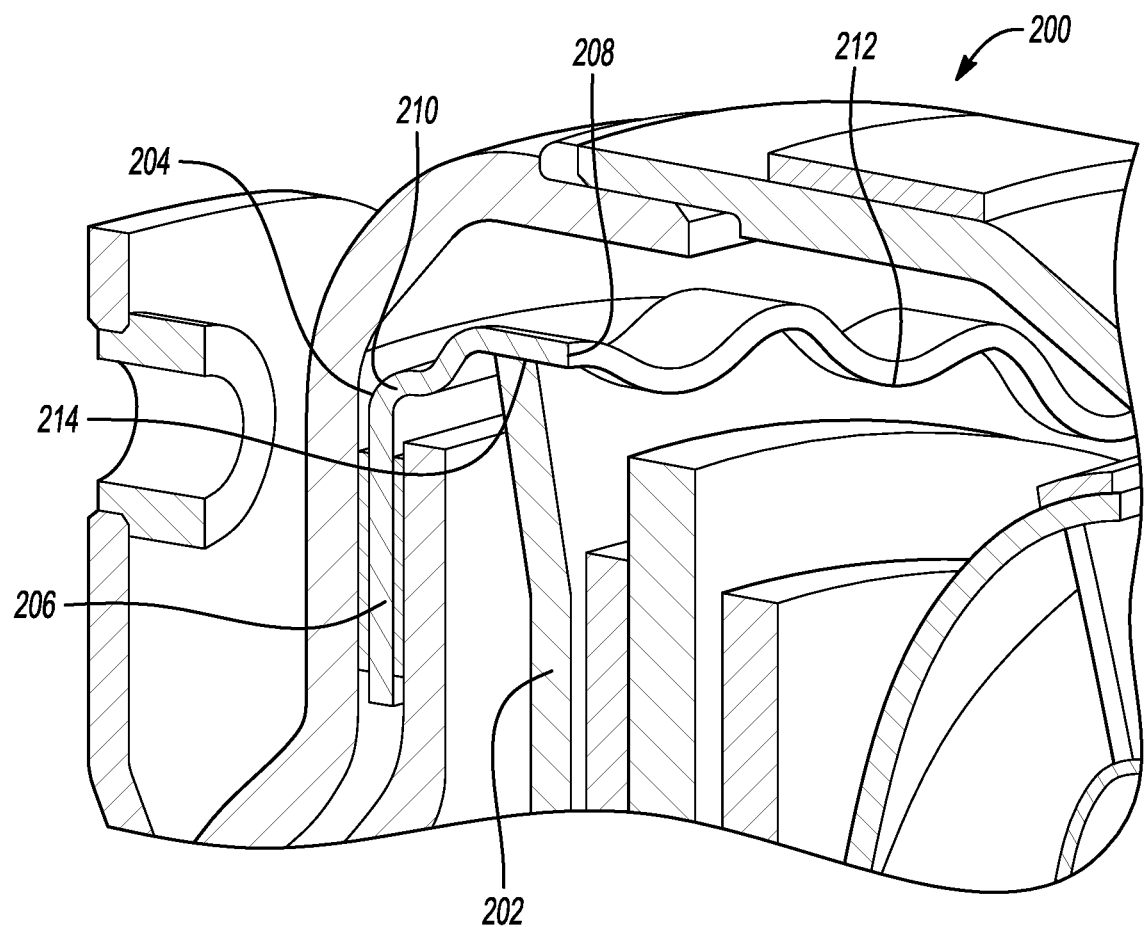
FIG. 6 is a perspective view, in cross section, of another torque converter.

FIG. 6 shows a torque converter 200 having a different design for the drive plate 202 and the friction disk 204. A main difference is the location of the connection surface being moved from the inner circumneutral edge to an outer ring. The friction disk 204 includes a radially extending portion 206 having a friction material disposed thereon. A ring 208 extends axially from an outer edge 210 of the radial portion 206. The ring 208 defines the connection surface 212 which may be similar to those described above. The drive plate 202 has an outer circumferential edge defining the connection surface 214 which may be similar to those described above. The drive plate 202 is received within the ring 208 with the connection surface 214 meshing with the connection surface 212 to rotationally couple the drive plate 202 and the friction disk 204.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

PARTS LIST 20 torque converter
21 central axis
22 case
24 impeller
26 turbine
28 stator
32 one-way clutch
34 hydrodynamic chamber
36 bypass clutch
60 clutch piston
62 chamber
64 compensation chamber
68 plate
70 friction disk
71 friction material
76 resilient member
80 front wall
90 damper
92 cover plate
94 drive plate
95 face
96 outer circumferential edge
98 inner circumferential edge
100 driven plate
102 resilient member
110 connection surface
112 undulated profile
114 convex segments
116 concave segments
120 connection surface
122 undulated profile
124 convex segments
126 concave segments
150 outer circumferential edge
152 drive disk
154 flat spots
156 undulated profile
160 inner circumferential edge
162 friction disk
164 flat spots
166 undulated profile
200 torque converter
202 drive plate
204 friction disk
206 radial portion
208 ring
210 outer edge
212 connection surface
214 connection surface

What is claimed is:

1. A torque converter comprising:
a case defining a chamber;
an impeller disposed in the chamber;
a turbine disposed in the chamber adjacent to the impeller and configured to create a fluid coupling with the impeller;
a bypass clutch including a plate fixed to the case and a friction disk having a friction material configured to engage with the plate to rotationally couple the friction disk to the plate when the bypass clutch is engaged, wherein the friction disk includes a first connection surface with a first undulated profile oriented in a radial direction of the torque converter and defined by a plurality of alternating first convex and concave arcuate segments; and
a damper configured to transmit torque from the bypass clutch to a turbine shaft, the damper including a drive plate circumscribed by the first connection surface and having a second connection surface with a second undulated profile oriented in the radial direction and defined by a plurality of alternating second convex and concave arcuate segments, wherein the first and second connection surfaces are in meshing engagement with the first convex segments received in the second concave segments and the second convex segments received in the first concave segments to couple the friction disk to the drive plate.

2. The torque converter of claim 1, wherein the drive plate is rotationally fixed to the turbine.

3. The torque converter of claim 1, wherein the damper further includes a driven plate configured to connect with the turbine shaft and a resilient member connected between the driven plate and the drive plate.

4. The torque converter of claim 1, wherein the first connection surface is defined on an inner circumferential edge of the friction disk, and the second connection surface is defined on an outer circumferential edge of the drive plate.

5. The torque converter of claim 1, wherein the friction disk further includes a ring extending axially from an outer edge of the friction disk, wherein the ring defines the first connection surface, and the drive plate is received within the ring.

6. The torque converter of claim 1, wherein each of the first concave arcuate segments have a continuous radius, each of the first convex arcuate segments have a continuous radius, each of the second concave arcuate segments have a continuous radius, and, each of the second convex arcuate segments have a continuous radius.

7. A torque converter comprising:
a case;
a bypass clutch including a plate rotationally fixed to the case and a friction disk having a friction material configured to engage with the plate to rotationally couple the friction disk to the plate when the bypass clutch is engaged, wherein the friction disk includes a first circumferential connection surface with a first undulated profile defined by a plurality of alternating convex and concave arcuate segments; and
a drive plate including a second circumferential connection surface with a second undulated profile defined by a plurality of alternating convex and concave arcuate segments, wherein the first and second connection surfaces are in meshing engagement with the convex segments of the friction disk meshing with the concave segments of the drive plate and with the concave segments of the friction disk meshing with the convex segments of the drive plate.

8. The torque converter of claim 7, wherein the concave and convex arcuate segments of the friction disk have a same radius.

9. The torque converter of claim 8, wherein the concave and convex arcuate segments of the drive plate have a same radius.

10. The torque converter of claim 9, wherein, for the friction disk, the concave arcuate segments have a longer arc length than the convex arcuate segments, and wherein, for the drive plate, the convex arcuate segments have a longer arc length than the concave arcuate segments.

11. The torque converter of claim 7 further comprising a turbine rotationally fixed to the drive plate.

12. The torque converter of claim 7 further comprising a damper including a resilient member and a driven plate configured to rotationally couple with a transmission input shaft, wherein the resilient member is connected between the drive plate and the driven plate.

13. The torque converter of claim 7, wherein the friction disk circumscribes the plate.

14. The torque converter of claim 7, wherein the first circumferential connection surface is formed on an inner circumferential edge of the friction disk.

15. The torque converter of claim 7, wherein the friction disk further includes a ring extending axially from an outer edge of the friction disk, wherein the ring defines the first circumferential connection surface.

16. The torque converter of claim 15, wherein the drive plate is circumscribed by the ring.

17. The torque converter of claim 7, wherein the alternating convex and concave arcuate segments of the friction disk are continuous around a circumference of the first connection surface, and the alternating convex and concave arcuate segments of the drive plate are continuous around a circumference of the second connection surface.

18. A torque converter comprising:
a case defining a chamber;
an impeller disposed in the chamber;
a turbine disposed in the chamber adjacent to the impeller and configured to create a fluid coupling with the impeller;
a bypass clutch including a plate fixed to the case and a friction disk having a friction material configured to engage with the plate to rotationally couple the friction disk to the plate when the bypass clutch is engaged, wherein the friction disk includes a first circumferential connection surface with a first undulated profile defined by a plurality of alternating convex and concave arcuate segments; and
a damper including a driven plate connectable to a turbine shaft, a drive plate rotationally fixed to the friction disk and the turbine, and a resilient member connecting the driven plate to the drive plate, the drive plate includes a second circumferential connection surface circumscribed by the first connection surface, the second connection surface having a second undulated profile defined by a plurality of alternating convex and concave arcuate segments meshing with the concave and convex segments of the friction disk to rotationally fix the drive plate to the friction disk.

19. The torque converter of claim 18, wherein the concave and convex arcuate segments of the friction disk have a same radius, and wherein the concave and convex arcuate segments of the plate have a same radius.

20. The torque converter of claim 18, wherein, for the friction disk, the concave arcuate segments have a longer arc length than the convex arcuate segments, and wherein, for the drive plate, the convex arcuate segments have a longer arc length than the concave arcuate segments.

* * * * *